Jan. 28, 1969  C. J. ANDEXLER  3,424,484

BALL JOINT WITH RESILIENT PRESSURE PLATE

Filed Feb. 21, 1968

INVENTOR.
CHARLES J. ANDEXLER
BY
*Baldwin, Egan, Walling & Fetzer*
ATTORNEYS

United States Patent Office 3,424,484
Patented Jan. 28, 1969

3,424,484
BALL JOINT WITH RESILIENT PRESSURE PLATE
Charles J. Andexler, Twinsburg, Ohio, assignor to Barmatic Machines, Inc., Cleveland, Ohio, a corporation of Ohio
Filed Feb. 21, 1968, Ser. No. 707,045
U.S. Cl. 287—87     9 Claims
Int. Cl. F16c *11/06;* F16b *7/00;* B25g *3/38*

ABSTRACT OF THE DISCLOSURE

A resilient pressure plate of synthetic resin is disclosed holding the parts of a ball and socket joint assembled under tension. The pressure plate is of a shallow cup-shape held in compression by a top seat engaging the rim of the cup and the rounded head of a ball stud engaging the central bottom portion of the plate. There is a central through opening through the bottom of the cup-shape member and a radially extending slot from that central opening outwardly entirely through the cup-shape member to permit the resilient pressure plate to compress under tension. Other features may include openings through the resilient plate for the passage of lubricant and stop members on the interior surface of the bottom of the cup-shape member to limit the compression thereof.

---

Ball joint assemblies are well known comprising a socket or housing having an open end through which a stud passes for connection with an operating member. Surrounding the stud is a ball member in the form of a spherical segment supported against a coacting surface in the socket for rotational and pivotal movement of the stud. The ball member is held on the stud by a unitary head and the resilient pressure plate of this invention is held in compression against this head by a top seat member affixed to the housing or socket.

The object of the present invention is to provide a sturdy and efficient pressure plate which is cheap and easily manufactured and which is simple to assemble.

Other objects and advantages of this invention will be apparent from the accompanying drawings and description and the essential features will be set forth in the appended claims.

In the drawings,

FIG. 2 is a top plan view of the resilient pressure plate shown in FIG. 1; while

Figure 1:
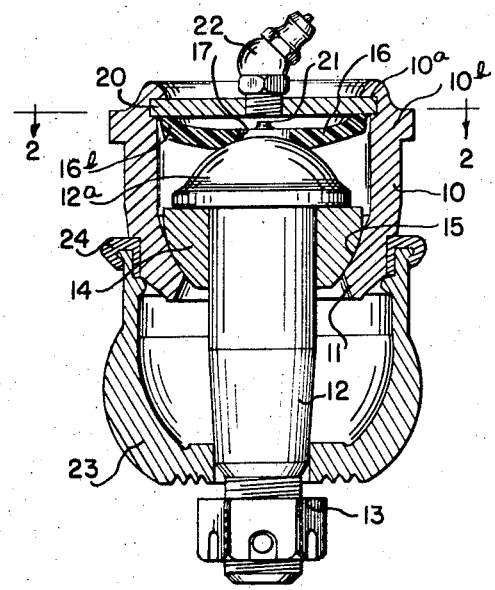
FIG. 1 is a central sectional view through a ball joint assembly utilizing the resilient pressure plate of the present assembly.

The ball joint assembly herein shown and described comprises a housing or socket 10 which is generally metallic and has an opening at one end 11 through which projects a stud 12 adapted to be connected at 13 to a coacting member (not shown). A ball member 14 in the form of a spherical segment slidably embraces the stud 12 and is held in position thereon by the head 12a of the stud with a rounded upper surface. The ball member 14 engages against a complementary bearing surface 15 on the interior surface of the socket 10 near the opening 11. This permits the usual rotational and pivotal movement of the stud 12.

Figure 3:
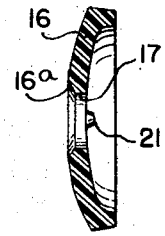
FIG. 3 is a central sectional view taken along the line 3—3 of FIG. 2.

The present invention involves a resilient pressure plate 16 which is of shallow cup-shape having a depth between about ¼ and about ⅛ of the diameter thereof. The resilient pressure plate has a generally rounded bottom when unstressed as seen in FIG. 3 but this flattens out under compression as shown in FIG. 1. In the center of the underside of the bottom of the cup-shape member 16 there is provided a shallow recess 16a adapted to receive and ride upon the rounded head 12a of the stud 12. Preferably also there is a central through opening 17 through the bottom of the cup-shape member through which lubricant may pass to the engaged surface of the stud head 12 as will presently appear.

Figure 2:
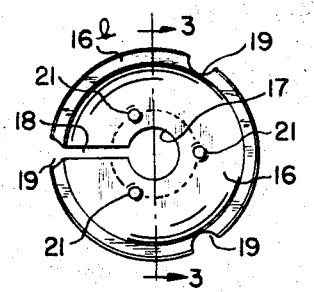

Referring to FIG. 2, there is a radially extending slot 18 running from the open center 17 out through the rim of the cup-shape member and this permits the resilient compression of the cup-shape member when assembled as shown in FIG. 1. The member 16 has an upstanding rim 16b extending entirely around the member 16 except, where desired, a plurality of openings 19, three being shown, through which lubricant will pass as will presently be described, may be provided.

With the parts 10, 12 and 14 assembled in the position shown in FIG. 1, the resilient pressure plate 16 is placed bottom down upon the stud head 12a and a top seat 20 is placed in the position shown to compress the member 16 and while held in that position is locked in place by peening over the upper end portion of the socket 10 as shown at 10a in FIG. 1. It will be noted that the top seat 20 rests against a shoulder 10b on the socket 10.

If necessary or desirable, one or more stop members 21 may be provided upstanding from the interior surface of the bottom of the member 16 and these limit the compression which can be applied to the rim 16b of the member 16.

Preferably, a lubricant fitting 22 is provided centrally of the top seat 20 through which lubricant may be supplied to the interior of the member 16 in the assembled position of the parts as shown in FIG. 1. This lubricant will pass through the opening 17 to lubricate the engagement between the members 16 and the stud head 12a. Other lubricant may pass through the openings 19 so as to lubricate the bearing of the ball member 14 against the surface 15 of the socket 10.

Preferably, but not necessarily, a dust cover 23 is provided held in position by ring 24 secured to the socket 10 to protect the parts against the wear which would occur if dust were not eliminated.

The material which I have found best adapted for forming the resilient pressure plate 16 is a synthetic plastic having approximately the following physical characteristics: specific gravity, 1.05 to 1.50; tensile strength, 8,000 p.s.i. to 12,000 p.s.i.; percent elongation, 25 to 300; modulus of elasticity, 150,000 p.s.i. to 450,000 p.s.i.; compressive shtrength, 6,700 p.s.i. to 16,000 p.s.i.; and flexural strength, 8,000 p.s.i. to 16,000 p.s.i. A resin having the desired qualities is a polyacetal synthetic resin manufactured by E. I. du Pont de Nemours & Co., Inc. of Wilmington, Del., and sold under the trade name long chain polymeric amide generally called nylon. These long chain polymeric amide generally called nylon. These materials are readily molded to the form shown.

What is claimed is:

1. A ball joint assembly comprising a socket having at least one open end, a stud mounted for rotational and pivotal movement relative to said socket and having a head positioned in said socket and a shank integral with said head and extending freely through said open end, said socket having an internal bearing surface converging toward said open end and providing a bottom seat there, a partial ball member embracing said shank between said head and said bottom seat, said head having a rounded upper surface convex away from said shank, a shallow cup-shape resilient pressure plate formed of a polyacetal resin and having its bottom engaging said convex head surface and its rim turned upwardly away therefrom, there being a radially extending slot through said bottom extending from the center of said bottom outwardly and through said rim, whereby said pressure plate will have the stiffness of the polyacetal resin, with sufficient resiliency to compress the rim thereof toward said bottom, and a closure plate rigidly connected to said socket and closing the end thereof opposite said one open end and engaging said rim and holding said resilient pressure plate compressed against said convex head surface.

2. A ball joint assembly as defined in claim 1, including a central recess in the bottom of said pressure plate complementary to said convex head surface and holding said head and pressure plate centered.

3. A ball joint assembly as defined in claim 2, there being a through opening in the bottom of said pressure plate centrally of said recess, and a fitting providing communication through said closure plate for introduction of lubricant to the hollow of said cup-shape recess.

4. A ball joint assembly as defined in claim 3, there being at least one opening through said pressure plate near the rim thereof and permitting travel of lubricant from the hollow of said cup-shape pressure plate to the interior of said socket below said pressure plate.

5. A ball joint assembly as defined in claim 1, including stop means between said top seat and the bottom of said cup-shape pressure plate limiting the possible compressing of said resilient pressure plate.

6. A ball joint assembly as defined in claim 1, wherein said resilient pressure plate has a depth of said cup-shape between about one-fourth and about one-sixth of the diameter thereof.

7. A cup-shape resilient pressure plate for use in the ball joint assembly of claim 1 having a bottom with a central opening therethrough and an upstanding annular rim about the periphery of said bottom providing a cup-shape whose depth is between one-fourth and one-sixth of its diameter, there being a slot through said bottom extending from the center thereof radially outwardly and through said rim, and said pressure plate being formed of an acetal synthetic plastic.

8. A cup-shape resilient pressure plate for use in the ball joint assembly of claim 1 having a bottom with a central opening therethrough, and an upstanding annular rim about the periphery of said bottom providing a cup-shape whose depth is between one-fourth and one-sixth of its diameter, there being a slot through said bottom extending from the center thereof radially outwardly and through said rim, and said pressure plate being formed of a synthetic plastic chosen from the group consisting of Delrin and nylon.

9. A resilient pressure plate as defined in claim 7 wherein said synthetic plastic has the following approximate physical characteristics: specific gravity 1.05 to 1.50; tensile strength 8000 p.s.i. to 12000 p.s.i.; percent elongation 25 to 300; modulus of elasticity 150,000 p.s.i. to 450,000 p.s.i.; compressive strength 6700 p.s.i. to 16000 p.s.i.; and flexural strength 8000 p.s.i. to 16000 p.s.i.

References Cited
UNITED STATES PATENTS

| | | | |
|---|---|---|---|
| 2,083,718 | 6/1937 | Kull et al. | 287—90 |
| 2,937,895 | 5/1960 | Langen et al. | 287—87 |
| 2,993,716 | 7/1961 | Langen | 287—90 |

CARL W. TOMLIN, *Primary Examiner.*

ANDREW KUNDRAT, *Assistant Examiner.*

U.S. Cl. X.R.

287—90